United States Patent [19]
Nickel et al.

[11] 3,963,651
[45] June 15, 1976

[54] METHOD OF CROSS LINKING AND HARDENING OF GRAPHITIC FORMED BODIES

[75] Inventors: Hubertus Nickel, Julich; Hartmut Luhleich, Duren; Francesco Dias, Julich, all of Germany

[73] Assignee: Kernforschungsanlage Julich Gesellschaft mit beschrankter Haftung, Julich, Germany

[22] Filed: Dec. 9, 1974

[21] Appl. No.: 531,036

[52] U.S. Cl. ............................................. 260/2.5 F
[51] Int. Cl.² ............................................. C08J 9/00
[58] Field of Search ................................. 260/2.5 F

[56] References Cited
UNITED STATES PATENTS

| | | | |
|---|---|---|---|
| 3,708,442 | 1/1973 | Franck et al. | 260/2.5 F |
| 3,759,848 | 9/1973 | Omran et al. | 260/2.5 F |
| 3,784,487 | 1/1974 | Franck et al. | 260/2.5 F |

*Primary Examiner*—Harry Wong, Jr.
*Assistant Examiner*—Frank R. Cervi
*Attorney, Agent, or Firm*—Walter Becker

[57] ABSTRACT

A method of cross-linking and hardening with the aid of heat a porous formed body of a synthetic graphite or similar material, especially a fine granular graphite, which is bonded by means of a synthetic resin binding agent on a novolak basis. The thus formed porous body is a temperature of from 100°C to 200°C gassed by a quantity of formaldehyde which quantity depends on the predetermined extent of cross-linking of the formed body, while the formaldehyde is caused to pass from the outer surface of the formed body into the interior thereof.

2 Claims, No Drawings

METHOD OF CROSS LINKING AND HARDENING OF GRAPHITIC FORMED BODIES

The present invention relates to a method of cross-linking and hardening with the aid of heat of porous formed bodies of synthetic graphites or similar substances, especially fine granular graphites, which are bonded by means of a synthetic resin binding substance, such as phenolformaldehyde resin on the basis of novolak.

Formed bodies of the above mentioned type are employed in the metal processing industry for the manufacture of casting molds and are also used in connection with the manufacture of fuel and/or breeder elements for gas-cooled high temperature reactors, and is furthermore used in connection with the manufacture of structural elements for such core reactors. In this connection, a very fine granular graphite should be used wherever possible.

In conformity with a heretofore known manufacturing method for formed bodies of synthetic graphites or similar substances, according to a first method step, graphite particles together with the phenolformaldehyde resins on a novolak basis which serve as binding substance and dissolved in a solvent are mechanically intermixed and, while simultaneously adding hexamethylenetetramine as hardener, are subsequently formed. The cross linking and hardening of the formed bodies is effected in an additional method step while adding heat at increased temperature. By means of the hardening process it is intended to bring about that during the subsequent coking of the molded bodies at from 800 to 1000 C. no deformations can occur any longer. A good cross linking is desired because it is from this cross linking that the coke output and the strength properties of the graphitic molded body will depend after the coking process. The drawback of this known method consists in that the mechanical mixing of graphite particles with binding substances and hardeners will not be sufficient to distribute the binding substance as well as the hardener so uniformly over the surface of the graphite particles that no incomplete cross linking will occur at least in the micro range during the subsequent hardening of the molded body. Ranges of complete cross linking will in the subsequent coking process form undesired soft zones which affect the form resistance of the respective body.

According to another heretofore known method, a uniform distribution of binding substance on the surface of the fine granular graphites employed as filler is realized by introducing fine granular graphites into an emulsion containing the binding substance. If with this method, synthetic resin binding substances are employed as, for instance, phenolformaldehyde resins on a novolak basis, the hexamethylenetetramine suitable for these resins being water soluble cannot be employed as hardener. During the emulsifying process, the hexamethylenetetramine is dissolved out of the synthetic resin binder. The formed bodies therefore cannot be hardened by the additional heat.

It is, therefore, an object of the present invention to provide a method of cross linking and hardening of molded bodies of synthetic graphites or similar materials bonded by means of a synthetic resin binding substance as phenolformaldehyde resins on a novolak basis, which method will bring about a uniform cross linking and a homogeneous hardening of the molded bodies. The method starts with porous formed bodies as they can be produced in particular in conformity with the above mentioned known emulsifying method without, however, limiting the hardening method according to the invention to molded bodies produced in conformity with the emulsifying method.

The above mentioned object has been realized by gassing the molded bodies at a temperature of from 100°to 200°C. with a quantity of formaldehyde, which quantity advances from the surface of the molded body toward the interior and which depends on the predetermined degree of interlinking of the molded bodies. The bodies penetrated by the formaldehyde will in all regions show a very homogeneous cross linking which will in particular also meet the high requirements called for in a reactor construction, above all, with regard to the strength properties of the graphitic formed body.

It is advantageous that the required degree of cross linking can be determined in conformity with the requirement by the quantity of formaldehyde conveyed to the formed body. Also, small doses are possible. The entering of the gas from the surface of the molded body into the interior will, during the hardening process, bring about a desired quick stabilization of the surface ranges which, in turn, has a favorable effect upon the form stability of the molded bodies.

In order to accelerate the inflow of the gaseous formaldehyde into the molded body, it is sufficient according to a further development of the method of the invention that the formed bodies are evacuated at least partially prior to the gassing with formaldehyde. An evacuation of the molded bodies preceding the treatment with formaldehyde is of advantage particularly when the graphite particles were in dissolved form covered by binding substances in order as far as possible to completely vaporize the solvents prior to the hardening process.

The invention will now be described in connection with some actual examples.

When carrying out the hardening method according to the invention, it has been found particularly advantageous when the molded bodies remain in an atmosphere which contains formaldehyde, and do so for a time period which depends on the predetermined degree of cross linking. The staying time to be selected for the formed bodies varies also in conformity with the proportion of open pores per surface of the molded bodies and can be varied in conformity with the course of reaction of the cross linking process. In general, the staying time will be all the shorter the more pores and the more porous the formed bodies are. The method according to the invention is therefore greatly suitable, especially for hardening of such formed bodies which are produced in conformity with the emulsifying method.

Therefore, for preparing the formed bodies, fine granular graphites were therefore, according to the emulsifying method, covered with novolak as binding substance for the synthetic resins. The formed bodies subsequently preformed and dried in corresponding molds were heated in reaction vessels to a temperature of approximately 110°C. for purposes of hardening. After the prescribed temperature has been reached, gaseous formaldehyde was passed by means of corresponding connecting conduits through the reaction vessel. At ordinary pressure, the hardening of cylindrical molded bodies produced with a binder proportion of 50% by weight and having a diameter of approximately 15 mm and a length of approximately 50 mm was completed approximately after half an hour. An acceleration of the method was obtained by introduction of formaldehyde at an overpressure.

According to another example, formed bodies prepared in conformity with the emulsifying method were inserted into a vacuum vessel. For producing formaldehyde during the evacuating process, solid paraformaldehyde was distributed on the bottom of the vacuum vessel. The weight of the solid paraformaldehyde had a ratio of 15:1 to the weight of the synthetic resin binder incorporated in the formed bodies. The weight ratio of paraformaldehyde to the synthetic resin binder may be selected in conformity with the intended degree of hardening as varying from 1:1 to 50:1. The hardening itself is effected at a temperature of from 160°C. to 180°C. At this temperature, the solid paraformaldehyde disintegrates and frees gaseous formaldehyde which acts upon the molded bodies from the outer surface toward the interior. Formed bodies with the same proportion of binding substance and of the same size as those according to the preceding examples were hardened within a time period of from approximately 5 to 10 minutes.

For the sake of completeness it may also be pointed out that the term novolak generally designates phenol-formaldehyde resins which are formed during the reaction of phenol with formaldehyde in the presence of acidic condensation substances. Novolaks are also formed when instead of the phenol other aromates with OH-groups, as for instance, resorcinol, react with formaldehyde or with another aldehyde in the presence of acidic condensation substances (see Houben/Weyl, "Methoden der organischen Chemie," Georg Thieme Verlag, Stuttgart 1963 Bd. XIV, "Makromolekulare Stoffe", Teil 2, Seite 272 ff). Each of these novolaks can also be used as a binder for synthetic material when producing molded bodies from synthetic graphites or similar substances.

It is, of course, to be understood that the present invention is, by no means, limited to the specific examples set forth above, but also comprises any modifications within the scope of the appended claims.

What we claim is:

1. A method of cross-linking and hardening with the aid of heat to effect quick stabilizing of outside surface of a formed porous body of synthetic graphitic material that is bonded by means of a synthetic resin binding agent on a novolak basis, which includes in combination the steps of exclusively gassing the formed body at a temperature of from 100°C to 200°C with a quantity of formaldehyde which depends on a predetermined extent of cross-linking of said formed body, while causing said formaldehyde to advance from the outside surface of said formed body into the interior thereof.

2. A method in combination according to claim 1, which includes the step of at least partially evacuating said formed body prior to gassing the same with formaldehyde.

* * * * *

UNITED STATES PATENT OFFICE
CERTIFICATE OF CORRECTION

Patent No. 3,963,651     Dated June 15, 1976

Inventor(s) Hubertus Nickel et al.

It is certified that error appears in the above-identified patent and that said Letters Patent are hereby corrected as shown below:

On the Title Page, Item [30] should read:

Germany          23609827          December 7, 1973

Signed and Sealed this

Seventh Day of June 1977

[SEAL]

Attest:

RUTH C. MASON
*Attesting Officer*

C. MARSHALL DANN
*Commissioner of Patents and Trademarks*